US012706946B1

(12) United States Patent
Stude et al.

(10) Patent No.: US 12,706,946 B1
(45) Date of Patent: Aug. 11, 2026

(54) PROGRAMMATIC THREAT INTELLIGENCE AGGREGATION AND DISTRIBUTION SYSTEM

(71) Applicant: Amazon Technologies, Inc., Seattle, WA (US)

(72) Inventors: Cydney Stude, Chesapeake, VA (US); Hart Matthew Rossman, Vienna, VA (US); Ricarte De Vera, Austin, TX (US); Jeremy Lowry, Falls Church, VA (US); Allison Grace DeCastro, South Weymouth, MA (US); Nathan Brock Bates, Silver Spring, MD (US); Matthew Harvey, Chesapeake, VA (US); Nauman Charania, Seattle, WA (US); Matthew I Bretan, Irvine, CA (US); Ben Fletcher, Dublin (IE); Shannon Diane Brazil, Canmore (CA); Richard Billington, Kenmore Hills (AU)

(73) Assignee: Amazon Technologies, Inc., Seattle, WA (US)

( * ) Notice: Subject to any disclaimer, the term of this patent is extended or adjusted under 35 U.S.C. 154(b) by 76 days.

(21) Appl. No.: 18/963,291

(22) Filed: Nov. 27, 2024

(51) Int. Cl.
*H04L 9/40* (2022.01)
*G06F 40/151* (2020.01)
*H04L 43/045* (2022.01)

(52) U.S. Cl.
CPC ........ *H04L 63/1441* (2013.01); *G06F 40/151* (2020.01); *H04L 43/045* (2013.01)

(58) Field of Classification Search
CPC .. H04L 63/1441; H04L 43/045; G06F 40/151
See application file for complete search history.

(56) References Cited

U.S. PATENT DOCUMENTS

| | | | | |
|---|---|---|---|---|
| 10,585,771 | B1 * | 3/2020 | Gheva | G06F 11/3409 |
| 11,301,357 | B1 * | 4/2022 | Gacek | G06F 11/323 |
| 11,895,126 | B1 * | 2/2024 | Satish | H04L 63/1425 |
| 2015/0180891 | A1 * | 6/2015 | Seward | H04L 63/1416 726/22 |
| 2021/0117251 | A1 * | 4/2021 | Cristofi | G06F 21/554 |
| 2022/0294715 | A1 * | 9/2022 | Agrawal | H04L 63/1408 |
| 2024/0256663 | A1 * | 8/2024 | Thompson | G06F 21/554 |
| 2024/0362208 | A1 * | 10/2024 | Naufel | G06F 16/243 |
| 2025/0209094 | A1 * | 6/2025 | Mandal | G06F 16/248 |

* cited by examiner

*Primary Examiner* — J. Brant Murphy
(74) *Attorney, Agent, or Firm* — Knobbe, Martens, Olson & Bear, LLP

(57) ABSTRACT

A system for enhancing security in networked environments through the aggregation, transformation, and dissemination of security incident data. The system collects data from various sources, including human threat intelligence and machine-readable logs, and transforms this data into a machine-executable data structure. The system stores the transformed data in a threat intelligence data store, making the threat intelligence data store accessible via application programming interface (API) calls. The system includes components that implement large language models (LLMs) to generate security incident summaries and visualizations tailored to specific user roles.

20 Claims, 5 Drawing Sheets

PROGRAMMATIC THREAT INTELLIGENCE AGGREGATION AND DISTRIBUTION SYSTEM

BACKGROUND

Organizations face increasing challenges in managing security events due to the complexity and sophistication of modern cyber threats. Existing systems often rely on automated processes to generate alerts based on predefined rules and patterns. While these systems can process large volumes of information quickly, they frequently lack the contextual understanding required to address evolving threats effectively. Automated systems may overlook subtle indicators of compromise or fail to correlate disparate pieces of information, leading to incomplete or inaccurate assessments.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
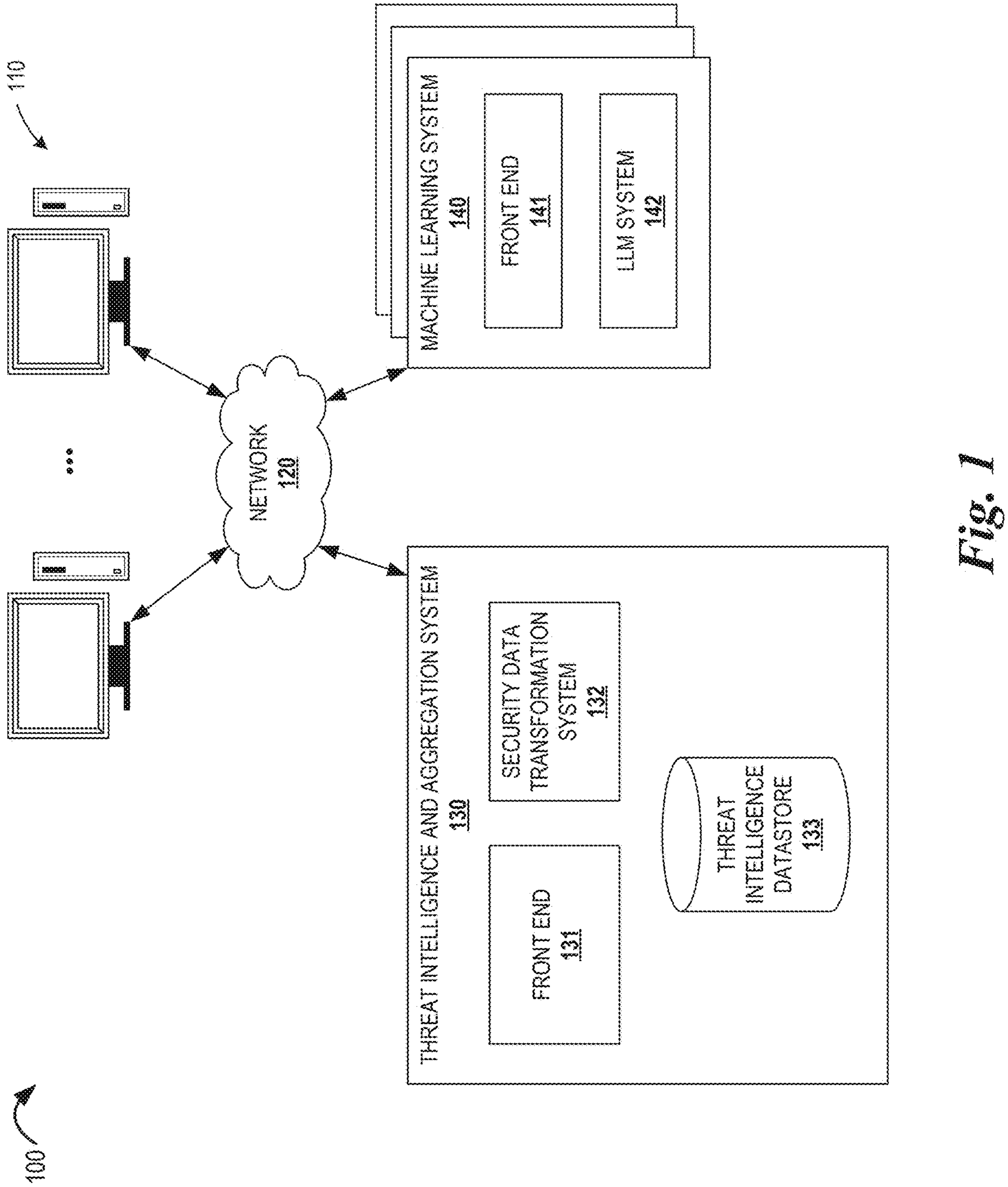
FIG. 1 shows an example computing environment for a threat intelligence and aggregation system to aggregate, transform, and disseminate security incident data in accordance with this disclosure.

The present disclosure relates to providing enhanced security for networked systems through aggregation, transformation, and dissemination of security incident data. The systems as described herein collect data from various sources, including human threat intelligence (for example, in the form of incident reports) and machine-readable log data, to provide a comprehensive view of security incidents. The systems as described herein transform the collected data into machine-executable data structures, such as in JavaScript Object Notation (JSON), extensible Markup Language (XML), comma separated value (CSV), or another format, which facilitates integration with large language models (LLMs) and other services. By leveraging both human insights and machine-readable log data, the systems as described herein enhance access to incident data. Broader data access provides increased capabilities for threat detection and mitigation by applying the data for security and privacy auditing, for example. Advantageously, the systems as described herein improve the overall security posture of networked environments by enabling more efficient and informed responses to security incidents.

Some conventional approaches for managing security incidents in networked environments typically rely on automated systems that generate alerts based on predefined rules and patterns. While these systems can process large volumes of data quickly, they often lack the contextual understanding required to address sophisticated and evolving threats. Automated systems may overlook subtle indicators of compromise or fail to correlate disparate pieces of information, leading to incomplete or inaccurate threat assessments. The limitations of the automated systems can result in missed threats and delayed responses, compromising the security of networked environments.

Conventional systems also face issues with data redundancy and inefficiency, particularly in the context of formatting data. Each service that processes human threat intelligence individually converts the raw data into a format specific to that service. The services seeking to use the human threat intelligence may have incompatible formats, and thus no standard format exists to avoid the repetitive conversion. In some cases, conventional systems rely on manual effort for data formatting, which may increase the likelihood of human error, resulting in incorrect or incomplete threat intelligence being used for decision-making. Additionally, the lack of a standardized format for human threat intelligence causes each service to interpret and format the data differently, leading to inconsistencies and potential misinterpretations of threat intelligence data. The inconsistencies can restrict the ability of different services to effectively collaborate and share intelligence, ultimately weakening the overall security posture of the networked environment. Further, the repetitive conversion process is computer resource-intensive, requiring significant computational power and time, which may lead to delays in data access. The redundant formatting of data also introduces delays in the threat detection and mitigation process. As each service spends time converting and reformatting the data, the overall response time to security incidents increases. In some cases, the delay may be hours, days, or even weeks. The delay in incorporating human intelligence into security tools can result in prolonged exposure to threats and delayed response times, reducing the effectiveness of security measures. The issues of conventional systems highlight the need for a more efficient and standardized approach to handling human threat intelligence in networked security systems.

Some aspects of the present disclosure address some or all of the issues noted above, among others, by implementing computing devices to transform data from human threat intelligence and machine-readable data to a machine-executable data structure for execution to identify security vulnerabilities and/or mitigate security vulnerabilities. The systems as described herein collect data from various sources, including incident responder reports and machine-readable logs. Further, the transformation of collected data into a machine-executable format allows for integration with LLMs and other services (such as network-accessible services), facilitating the rapid dissemination and utilization of threat intelligence across different services. By providing a standardized format for threat intelligence, the system eliminates redundant data processing and ensures consistency in threat intelligence data. The standardization allows different services to interpret and apply the data without additional formatting, reducing the computational resources and time required for data processing. Additionally, the system includes mechanisms for redacting personally identifiable information (PII) to ensure privacy and compliance with data protection regulations. As the data is processed and transformed, any PII is identified and removed to protect the privacy of individuals involved in security incidents.

The systems described herein leverage combinations of human insights and machine-readable data to improve accuracy and timeliness of threat detection, identification, and/or mitigation. For example, incident responders contribute contextual knowledge and expert insights that are often missing from purely automated systems. The responder inputs may include detailed observations and nuanced interpretations of security incidents, which provide a richer understanding of the threat landscape. When this human intelligence is integrated with machine-readable data (such as log data from various networked components), the system can generate a more comprehensive and precise threat assessment. For example, LLMs may ingest the aggregated data to identify trends and correlations that incident responders and/or conventional systems may overlook if relying on a single source of data. Moreover, the improvement to timeliness of threat detection, identification, and/or mitigation may occur due to aggregation and standardization of data from multiple sources. By transforming the collected data into a machine-executable format the system creates a single repository of standardized threat intelligence. The centralized data repository may provide for enhanced access and dissemination of information to users, reducing the time required to process and analyze security incidents. In contrast to conventional approaches, where each service must individually format and interpret raw data, the standardized format allows for immediate integration with various security tools and systems. The streamlined process ensures that security teams receive actionable intelligence, enabling them to respond to threats in real-time (or substantially real-time).

The systems may provide the machine-executable data structure for other services (such as, network-accessible services) to execute by calling an API to access the machine-executable data structure and then performing operations with the extracted data. For example, when a third-party service initiates a request to the API, the API responds by providing at least a portion of the machine-executable data structure. This machine-executable data structure may include detailed information about a security incident, such as threat actor tactics, techniques, and procedures (TTPs), compromised components, and other relevant data points. Upon receiving the machine-executable data structure, the service parses the data to extract information associated with the service to provide. For example, in the context of a security audit, the service may analyze the machine-executable data structure to identify unauthorized access attempts, compromised user credentials, and other indicators of compromise. The service can then cross-reference this information with the service's own security logs and databases to detect any anomalies or patterns that may indicate a security breach. In another example, such as in a privacy audit scenario, the third-party service may use the machine-executable data structure to verify compliance with data protection regulations. The service can examine the extracted data to ensure that no PII is present or that any PII has been properly redacted.

Various aspects of the disclosure will now be described with regard to certain examples and embodiments, which are intended to illustrate but not limit the disclosure. Although aspects of some embodiments described in the disclosure will focus, for the purpose of illustration, on particular examples of security incident data collection and transformation, implementations of LLMs for security incident response and identification, mitigation, documentation and visualization generation, the examples are illustrative only and are not intended to be limiting. In some embodiments, the techniques described herein may be applied to additional or alternative security incident data collection and transformation, implementations of LLMs for security incident response and mitigation, documentation and visualization generation, and the like. Additionally, any feature used in any embodiment described herein may be used in any combination with any other feature or in any other embodiment, without limitation.

With reference to an illustrative embodiment, FIG. 1 shows an example computing environment 100 in which aspects of the present disclosure may be implemented. In some embodiments, as shown, the network environment may include any number of user devices 110, a network 120, a threat intelligence and aggregation system 130, and a machine learning system 140. The threat intelligence and aggregation system 130 further includes a front end 131, a security data transformation system 132, and a threat intelligence data store 133. The machine learning system 140 further includes a front end 141 and an LLM system 142. The network 120 enables communication between the user devices 110 and the threat intelligence and aggregation system 130 and the machine learning system 140.

The user devices 110 may represent users interacting with computing environment 100 to request access to security incident data. In some examples, users of the user devices 110 may include engineers, data scientists, or other personnel within an organization who request security incident data for jobs such as information technology (IT) staff, security engineers, management personnel, or other uses requested by the user devices 110. The user devices 110 may request security incident data via application programming interface (API) calls to obtain some or all of a machine-executable data structure associated with the security incident.

In some embodiments, the network 120 may be a publicly-accessible network of linked networks, possibly operated by various distinct parties, such as the Internet. In some cases, the network 120 may be or include a private network, personal area network, local area network, wide area network, global area network, cable network, satellite network, cellular data network, etc., or a combination thereof, some or all of which may or may not have access to and/or from the Internet. Although FIG. 1 illustrates a single network 120, the illustration is provided for purposes of example only, and is not intended to be limiting, required, or exhaustive. In some embodiments, the network 120 may include, or be in communication with, a plurality of networks. For example, the network 120 may include an internal network and a backbone network. The internal network may include a network connecting incident responders (or other personnel and/or computing hardware) together. In this way, the internal network may provide the incident responders a bandwidth dedicated for responding to security incidents without competing for networking resources. The backbone network may connect services between the components as illustrated in FIG. 1.

The threat intelligence and aggregation system 130 collects, processes, and distributes threat intelligence data. The threat intelligence and aggregation system 130 may interface with various data sources, including incident responder reports and machine-readable logs, to gather comprehensive information about security incidents. By integrating multiple data sources, the threat intelligence and aggregation system 130 may capture extensive threat intelligence, providing a holistic view of the security landscape. The threat intelligence and aggregation system 130 may include several sub-components, including a front end 131, a security data transformation system 132, and a threat intelligence data store 133.

The front end 131 of the threat intelligence and aggregation system 130 provides an interface for users and other systems to interact with the threat intelligence data. The front end 131 may include graphical user interfaces (GUIs), APIs, and software development kits (SDKs) that enable access to the threat intelligence and aggregation system 130. For example, GUIs may allow users to visually interact with the system, allowing for users to input data, query information, and view results. In some cases, APIs provide programmatic access to the threat intelligence and aggregation system 130, enabling other software applications to interact with the threat intelligence data. SDKs offer tools and libraries that developers can use to integrate capabilities of the threat intelligence and aggregation system 130 into other applications, streamlining the development process.

The security data transformation system 132 may convert the collected data into a machine-executable data structure. The security data transformation system 132 may process human intelligence from incident responders and machine-readable data from logs, transforming them into a standardized format, such as JSON. In some examples, the transformation process may involve parsing input data, extracting information included in the machine-executable data structure, and structuring the information for use by LLMs and other services. For example, network-accessible services may interact with the components of FIG. 1. The network-accessible services may include third-party services that may incorporate security incident data into products or services, for example, applications for performing security and/or privacy audits, information technology (IT) network monitoring applications, marketing services showcasing network downtime, etc. The network-accessible services may obtain data as disclosed herein using, for example, an API. In some cases, the security data transformation system 132 may deconstruct the input data into constituent parts, making it easier to analyze and process. Structuring the information in a standardized format ensures consistency and compatibility with other systems, facilitating seamless integration.

The threat intelligence data store 133 stores data associated with the security incident. For example, the threat intelligence data store 133 may store the human threat intelligence, the machine-readable data, and the machine-executable data structures generated by the security data transformation system 132. In some cases, the human threat intelligence may include incident reports including human-readable information provided by incident responders (for example, the incident report may include timeline of incident, root cause, and any other notes available from the incident responder). The machine-readable data may include device log data, including device-level data (such as, authorized or unauthorized access, session credentials from console, device access times and user identifiers, etc.) and networked interaction data (such as, region associated with the security incident, multi-factor authentication (MFA) by user identity, API event name occurrences, communication network addresses, device-level addresses, etc.). In this way, the threat intelligence data store 133 provides a centralized location for accessing and managing threat intelligence. By providing a centralized repository for the transformed data, the data store enables other services to access the information, for example, via API calls. These services can query the data store to execute the machine-executable data structure to provide information in association with the security incident, such as threat actor tactics, TTPs, indicators of compromise, responder actions associated with the affected systems, probability of compromise and/or assessing a customer for the probability of compromise (for example, identifying indicators of compromise and identifying a probability of compromise for other customers where the indicators of compromise are present), industry type, technology stack (such as, hardware components associated with the security incident), compromised components, and other relevant information.

The machine learning system 140 may interact with the threat intelligence and aggregation system 130 to provide machine learning models and services to perform jobs according to an identified use case. The machine learning system 140 may include components that operate machine learning models according to the use case. The components may include the front end 141 and the LLM system 142.

The front end 141 may provide an interface through which model operation usage requests from the threat intelligence and aggregation system 130 are received. In some cases, the front end 141 may include a GUI (for example, a web-hosted GUI capable of interacting with user devices and/or other systems), one or more APIs, a software development kit (SDK) (for example, capable of accessing the one or more APIs), and/or any other components capable to interface user devices and/or systems. The front end 141 may collect model data from the requests, such as model type, engine type, model source location (for example, by including an API call), and/or data type, and may transmit the information to other components within the machine learning system 140 for further processing.

The LLM system 142 may execute a model according to a usage request. As used herein, the use of an LLM is for illustrative purposes, and the model used to perform the functions as disclosed herein may be any type of model. For example, the model may be code prepared by an engineer without having a machine learning model perform any function. In other cases, the model may be a machine learning model (not specifically an LLM) and/or a combination of the approaches as disclosed herein (such as, a combination of code prepared by an engineer that includes a machine learning model). For example, according to the usage request, the machine learning system 140 may determine whether the LLM system 142 has local access to a particular model and/or data (for example, stored by an LLM data store). In some examples, the models may include an incident documentation model, an incident visualization model, a data transformation model, or another model associated with mitigating security vulnerabilities of the networked environment. The LLM system 142 may query an LLM data store (not shown) for a requested model, which may return a response indicating the LLM data store includes, or does not include, the requested model (or, in some cases, indicates the LLM data store includes a modified version of the requested model, which may satisfy the usage request with finetuning, additional training, etc.). In this way, if the machine learning system 140 locally has access to a model to satisfy the usage request, the machine learning system 140 may obtain the model from the LLM data store, for example. In some cases, the LLM system 142 may access the network 120 to identify the requested model found on a third-party online repository for models meeting usage request. In some examples, the LLM system 142 may be trained on historic (and/or synthetic) security incident data to develop a capability to generate security assessments. The LLM system 142 may output content from the models to another component of the computing environment 100 or a system or service not shown.

Figure 2A:
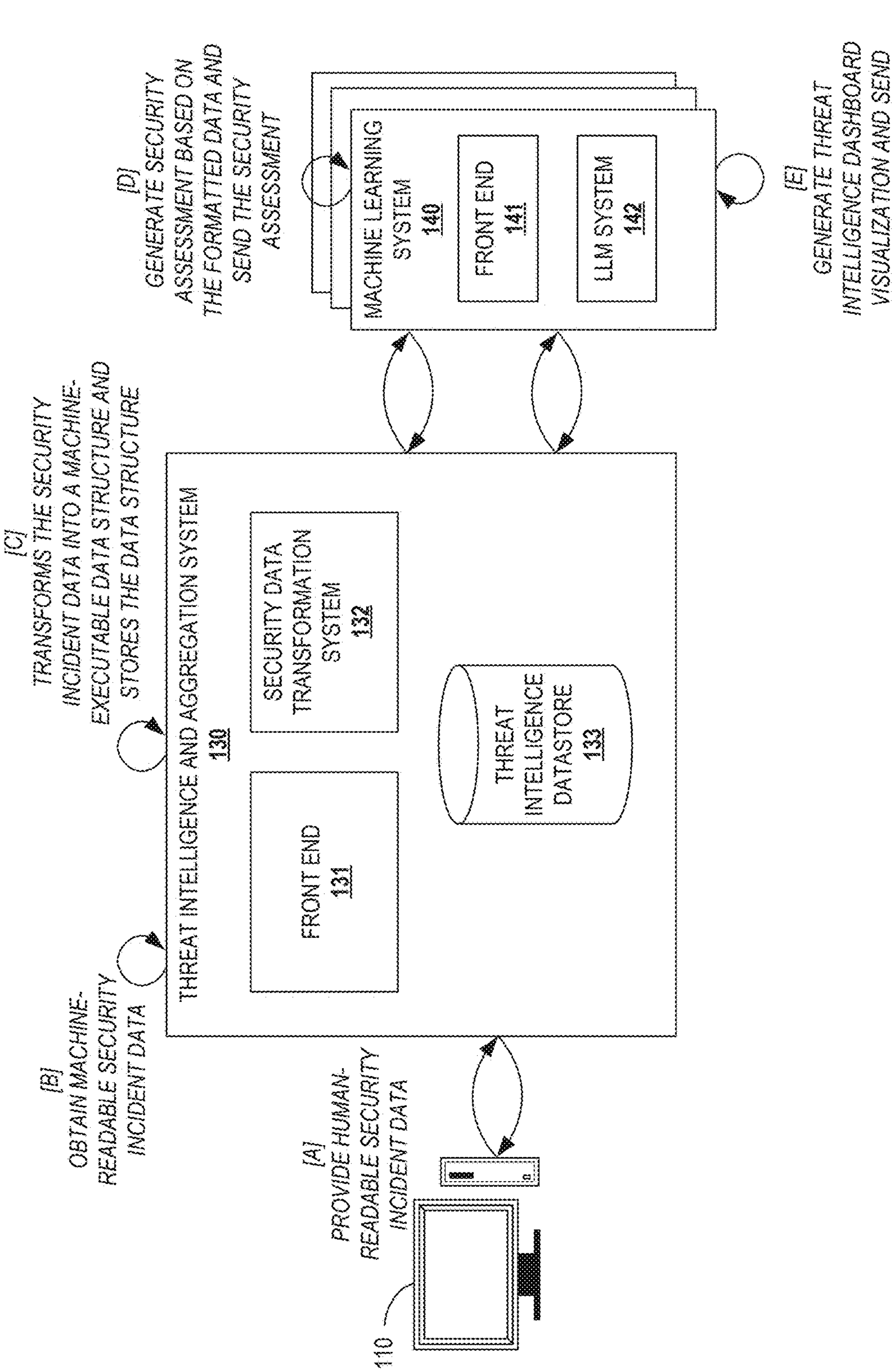
FIG. 2A illustrates a diagram of data flows and interactions between user devices, a threat intelligence and aggregation system, and an LLM system to aggregate, transform, and disseminate security incident data in accordance with this disclosure.

FIG. 2A is a diagram of illustrative data flows and interactions between user devices 110, threat intelligence and aggregation system 130, and machine learning system 140 to efficiently aggregate, transform, and disseminate security incident data.

At [A], the user devices 110 provides human-readable security incident data to the threat intelligence and aggregation system 130. In some cases, the user devices 110 may provide security incident data by individuals, such as incident responders, security analysts, or other personnel involved in managing security incidents. The human-readable data may include detailed observations, contextual knowledge, and expert insights about the security incident. For example, an incident responder might document a timeline of events, tactics and techniques used by the threat actor, root causes, and any mitigation actions taken. In some examples, the front end 131 of the threat intelligence and aggregation system 130 may receive the data as input. For example, the front end 131 may include one or more GUIs that allow users to visually interact with the threat intelligence and aggregation system 130.

At [B], the threat intelligence and aggregation system 130 obtains machine-readable security incident data. The machine-readable security incident data may derive from various systems involved in the security incidents. For example, the systems can include devices such as servers, workstations, mobile devices, routers, switches, and firewalls, among other systems and devices associated with the security incident. In some cases, user accounts and associated activities provide insights into potential unauthorized access or misuse. In some examples, software level agreements (SLAs) may contain information about the expected performance and security measures of software services, which can be useful for identifying deviations that indicate a security incident. For example, an SLA might specify the maximum allowable downtime or the required encryption standards for data transmission, and any breach of the terms could signal a security issue.

The machine-readable data may include device log data and networked interaction data. The device log data may capture detailed records of activities and events occurring on devices. The data can include device-level information such as authorized or unauthorized access attempts, session credentials from console logins, device access times, and user identifiers. The logs may provide detail about actions of users and devices during (and/or before, and/or after) the incident, which may provide a timeline of events. The networked interaction data may include information about the region associated with the security incident, which may provide the geographical origin of the threat or security incident. In some cases, MFA by user identity may provide details on whether additional authentication steps were successfully completed, indicating the level of security in place. In some examples, API event name occurrences track API calls made before, during, or after the incident, which can reveal the methods used by threat actors. In some examples, communication network addresses, such as IP addresses, and device-level addresses, like MAC addresses, may provide sources and targets of the security incident.

The threat intelligence and aggregation system 130 may obtain the machine-readable security incident data through several methods. In some examples, the threat intelligence and aggregation system 130 may obtain data stored in the threat intelligence data store 133. For example, incident responders may upload computer-readable security incident data to the threat intelligence data store 133, ensuring the information is centralized and accessible. The threat intelligence and aggregation system 130 can then parse the machine-readable security incident data. In some cases, the threat intelligence and aggregation system 130 may obtain security ticket information, which includes detailed records of the incident, such as the systems involved, the nature of the attack, and the response actions taken. The threat intelligence and aggregation system 130 may interact directly with the systems involved in the incident to obtain real-time (or near real-time) machine-readable security incident data.

At [C], the threat intelligence and aggregation system 130 transforms the security incident data into a machine-executable data structure and stores the data structure. The format of the machine-executable data structure may include data fields that capture information about the security incident. For example, the machine-executable data structure may at least have the following format:

{
"event_id":"alias/documentID?",
"ticket_type": "type 1/type 2",
"TLP": "Red/AmberStrict/Amber/Green/Clear",
"ip_addresses":["Address1", "Address2", "Address3"],
"user_agents":["Agent1", "Agent2", "Agent3"],
"id_string": {"TA0001":["T1190"], "TA0002": ["AT1002"], . . . }
"incident_summary":"Free text field, Responder summary of the event",
"incident_events_timeline": "Free text field, Responder timeline of the event",
"incident_start_date": "2024-01-04T00:15:00.000Z",
"incident_end_date": "2024-01-05T08:00:00.000Z"
. . .
}

The "event_id" field may be an identifier for the security incident, allowing for reference and tracking. The identifier may be an alias or a document ID that links to detailed records of the incident. The "ticket_type" field categorizes a type of a security ticket associated with the security incident. The "TLP" field may correspond to a Traffic Light Protocol, which is a system for classifying the sensitivity of the information. The values can be "Red," "AmberStrict," "Amber," "Green," or "Clear," each indicating different levels of confidentiality and sharing restrictions. The "ip_addresses" field contains a list of IP addresses associated with the incident. These addresses may include both source and destination IPs, providing critical information for tracing the origin and spread of the attack. The "user_agents" field lists the user agents involved in the incident, which may identify the types of devices and software used by the threat actors. The user agents information may provide for information regarding attack vectors and methods employed. The "id_string" field may be a structured representation of various identifiers related to the incident. For example, the id_string field may include mappings of threat actor tactics and techniques, such as {"TA0001":["T1190"], "TA0002": ["AT1002"]}, which may correspond to tactics and techniques used by the actors in the security incident. The structured format may correspond to threat intelligence frameworks, such as MITRE ATT&CK. The "incident_summary" field is a free text field where an incident responder provides a summary of the event. This summary may include a high-level overview of what happened, the impact of the incident, and any immediate actions taken. The "incident_events_timeline" field may be a free text field that captures a detailed timeline of the events. The timeline may include timestamps and descriptions of key actions and observations made in association with the incident response. The "incident start date" and "incident_end_date" fields record the start and end times of the incident, respectively. The timestamps provide a duration of the incident and may allow for correlating the security incident with other events and activities.

In some examples, the threat intelligence and aggregation system 130 may execute instructions to parse the security incident data and update fields of the machine-executable data structure with corresponding data elements from the security incident data. The parsing process may involve extracting information from the security incident data and mapping the information to predefined fields in the machine-executable data structure. In this way, the data may be organized in a consistent and standardized format, facilitating use by other systems and services. For example, the system may extract IP addresses from log files and populate the "ip_addresses" field, or may extract user agent strings from HTTP headers and populate the "user_agents" field.

In some examples, the threat intelligence and aggregation system 130 may execute an LLM to generate the machine-executable data structure. The LLM may analyze the security incident data, including both human intelligence and machine-readable data, to identify elements and relationships. The LLM may then generate the machine-executable data structure by populating the predefined fields with the extracted information. For example, the LLM may be trained on training security incident data allowing the LLM to analyze incident reports written by human responders to extract key details and populate the "incident_summary" and "incident_events_timeline" fields.

In some examples, the threat intelligence and aggregation system 130 may store the machine-executable data structure in the threat intelligence data store 133. By storing the data in the machine-executable data structure, the threat intelligence data store 133 allows services to access and utilize the information, for example, via API calls. The centralized storage may also facilitate data management and ensures the threat intelligence is readily available for analysis, reporting, validation and/or training existing models, and decision-making. For example, security tools can query the threat intelligence data store 133 to retrieve data points, such as IP addresses or user agents, and use this information to update their detection models and refine alerting mechanisms. The comprehensive approach ensures that all relevant information is available in a consistent and actionable format, enabling faster and more effective threat detection and mitigation.

At [D], the machine learning system 140 generates a security assessment based on the machine-executable data structure and sends the security assessment to the threat intelligence and aggregation system 130. In some cases, the machine learning system 140 may receive a request to generate a security incident summary from the threat intelligence and aggregation system 130. In response to receiving the request, the machine learning system 140 may access the threat intelligence data store 133 to obtain the machine-executable data structure. The machine-executable data structure includes detailed information about the security incident, and may be executed to cause presentation of information in association with the security incident, as disclosed herein. In response to the machine learning system 140 obtaining the machine-executable data structure, the machine learning system 140 may tokenize the machine-executable data structure. In this way, the machine learning system 140 may break down the machine-executable data structure into smaller data elements, called tokens. Each token may represent an element of the machine-executable data structure, such as a word, phrase, or symbol. For example, the "ip_addresses" field in the machine-executable data structure may be tokenized into individual IP addresses, while the "incident_summary" field may be tokenized into individual words or phrases. In some examples, the threat intelligence and aggregation system 130 may identify PII and remove the PII from the content created by the model. For example, the threat intelligence and aggregation system 130 may compare data from the security incident summary and the visualizations to stored PII (for example, stored in the threat intelligence data store 133). The threat intelligence and aggregation system 130 may then remove the PII from the content when PII is present.

After tokenizing the data of the machine-executable data structure, the machine learning system 140 may parse the tokens to extract information and identify patterns. The machine learning system 140 may compare the tokens to understand relationships and context within the machine-executable data structure. For example, the machine learning system 140 may parse the tokens in the "incident_events_timeline" field to identify a sequence of events and corresponding timestamps. Similarly, the machine learning system 140 may parse the tokens in the "id_string" field to correlate threat actor tactics and techniques with the incident. In this manner, the machine learning system 140 may associate the fields of the machine-executable data structure and the security incident assessment and/or other content generation.

In some examples, the security assessment may include alerts in association with the security incident. For example, the alerts in association with the security incident may be during the incident or after the incident, or otherwise in response to the incident occurring. The alerts may include information such as the nature of the threat, the affected systems, and the recommended actions to mitigate the threat. For example, an alert may indicate that a specific IP address has been identified as a source of unauthorized access attempts, prompting security teams to block the IP address and investigate further.

In addition to alerts, the machine learning system 140 may identify trends associated with the security incident. The trends may include patterns in threat actor behavior, common vulnerabilities exploited, and the frequency of specific types of attacks. For example, the LLM system 142 may detect that a particular type of malware is used repeatedly across multiple incidents, suggesting a coordinated campaign by a threat actor. By identifying these trends, the machine learning system 140 may provide insights into the evolving threat landscape. In some examples, the machine learning system 140 may generate recommendations in response to ingesting the machine-executable data structure. The recommendations may include specific actions to improve security posture, such as updating security configurations, implementing additional security controls, or conducting targeted training for security personnel. For example, if the analysis reveals that a particular vulnerability is being exploited, the LLM system 142 may recommend applying a patch or reconfiguring firewall rules to mitigate the risk. The LLM system 142 may adjust the recommendations to context of the security incident.

In some examples, the LLM system 142 may adjust the content generated according to a user status identifier. For example, the user status identifier may correspond to the user's role at the organization, permissions for the user, and services provided. For example, a security engineer may receive a detailed technical report that includes in-depth analysis of the incident, specific IP addresses involved, and recommended technical mitigations. In contrast, a member of the leadership team might receive a high-level summary that focuses on the overall impact of the incident, strategic implications, and recommended policy changes. The customization may provide for each user to receive information that corresponds to their role, enhancing the overall effectiveness of the security assessment.

At [E], the machine learning system 140 generates threat intelligence dashboard visualizations and sends the visualizations to the threat intelligence and aggregation system 130. The machine learning system 140 may process the machine-executable data structure to create visual representations of the security incident data. The visualizations may include various types of graphical elements such as charts, graphs, diagrams, etc. that illustrate different aspects of the security incident. For example, a timeline chart may depict the sequence of events in association with the incident, showing when each event occurred and how the incident progressed over time. For example, the events in association with the security incident may be during the incident or after the incident, or otherwise in response to the incident occurring. Another type of visualization could include a heat map that shows the geographical distribution of the threat, highlighting regions where the threat originated or where it had the most impact. Additionally, bar charts or pie charts may be used to represent the frequency of specific threat actor TTPs observed in association with the incident. The visualizations also include detailed technical information identifying the threat vector. For example, network diagrams may illustrate the flow of data between compromised components, showing how the threat actor moved laterally within the network.

The machine learning system 140 may adjust the visualizations according to the user status identifier, ensuring that the information presented is relevant to the user's role and responsibilities. For example, a security engineer may receive detailed technical visualizations that include specific IP addresses involved in the incident, user agent strings, and session credentials. The detailed visualizations may enable security engineers to perform in-depth analysis and take precise actions to mitigate the threat. On the other hand, a member of the leadership team might receive high-level visualizations that focus on the overall impact of the incident, strategic implications, and recommended policy changes. These high-level visualizations help leadership understand the broader context of the incident and make informed decisions about resource allocation and policy adjustments.

In response to the machine learning system 140 generating the visualizations, the machine learning system 140 sends the visualizations to the threat intelligence and aggregation system 130. The threat intelligence and aggregation system 130 then may cause the visualizations to be available through various interfaces, as described herein. In some examples, the users can access the visualizations via dashboards, which provide an interactive and user-friendly way to explore the security incident data.

Figure 2B:
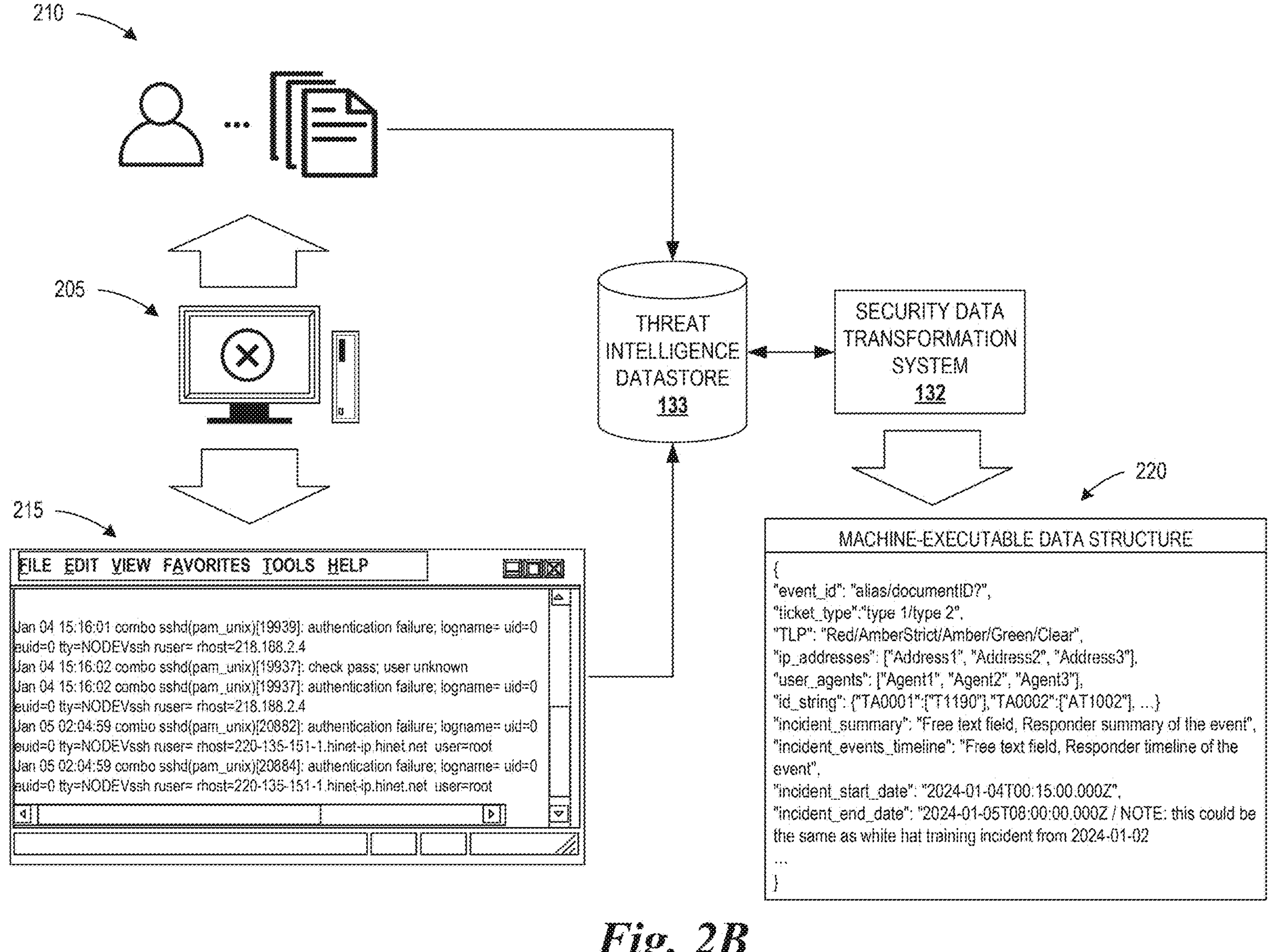
FIG. 2B illustrates an example diagram of coordination and transformation of security incident data to a machine-executable data structure in accordance with this disclosure.

FIG. 2B illustrates an example diagram of data flow in response to a security incident. The diagram includes a targeted device 205, incident response 210, log data 215, and machine-executable data structure 220. The targeted device 205 represents a computer identified as having a security incident. For example, the device may have been compromised by a threat actor, leading to unauthorized access or other malicious activities.

The incident response 210 includes human threat intelligence from incident responders and documentation from the response. Incident responders may be individuals who actively investigate and manage security incidents, providing valuable insights and contextual knowledge about the incident. The documentation may include detailed observations, timelines of events, descriptions of the TTPs used by the threat actors, and/or other information as disclosed herein.

The log data 215 captures machine-readable data from the targeted device 205, including detailed records of activities and events occurring on the device. The data can include information such as authorized or unauthorized access attempts, session credentials from console logins, device access times, and user identifiers. The log data provides a comprehensive view of the actions taken on the device, helping to trace the steps of the threat actor and identify potential vulnerabilities.

The human threat intelligence and the machine-readable data are stored in the threat intelligence data store 133. The threat intelligence data store 133 may provide a centralized repository for accessing and managing threat intelligence. Incident responders may upload the documentation and observations to the data store, ensuring that all relevant human intelligence is captured and stored. Similarly, the log data from the targeted device 205 may be automatically collected and uploaded to the data store. The centralized storage ensures that all relevant information is readily available for analysis and utilization, reducing the time and effort required to access and process threat intelligence.

The security data transformation system 132 accesses the data stored in the threat intelligence data store 133. To obtain the data, the security data transformation system 132 may query the data store 133 for records related to the security incident. For example, the security data transformation system 132 may retrieve incident responder reports, log files, and other relevant documents. The security data transformation system 132 may capture a comprehensive view of the security incident by integrating both human-readable and machine-readable data.

The security data transformation system 132 then may process the human intelligence and machine-readable data, transforming them into a machine-executable data structure 220, as described herein. In some examples, the machine-executable data structure 220 may include a format used for inputting into LLMs and accessing via an API. The machine-executable data structure 220 may include various fields that capture information about the security incident, as described herein.

Figure 3:
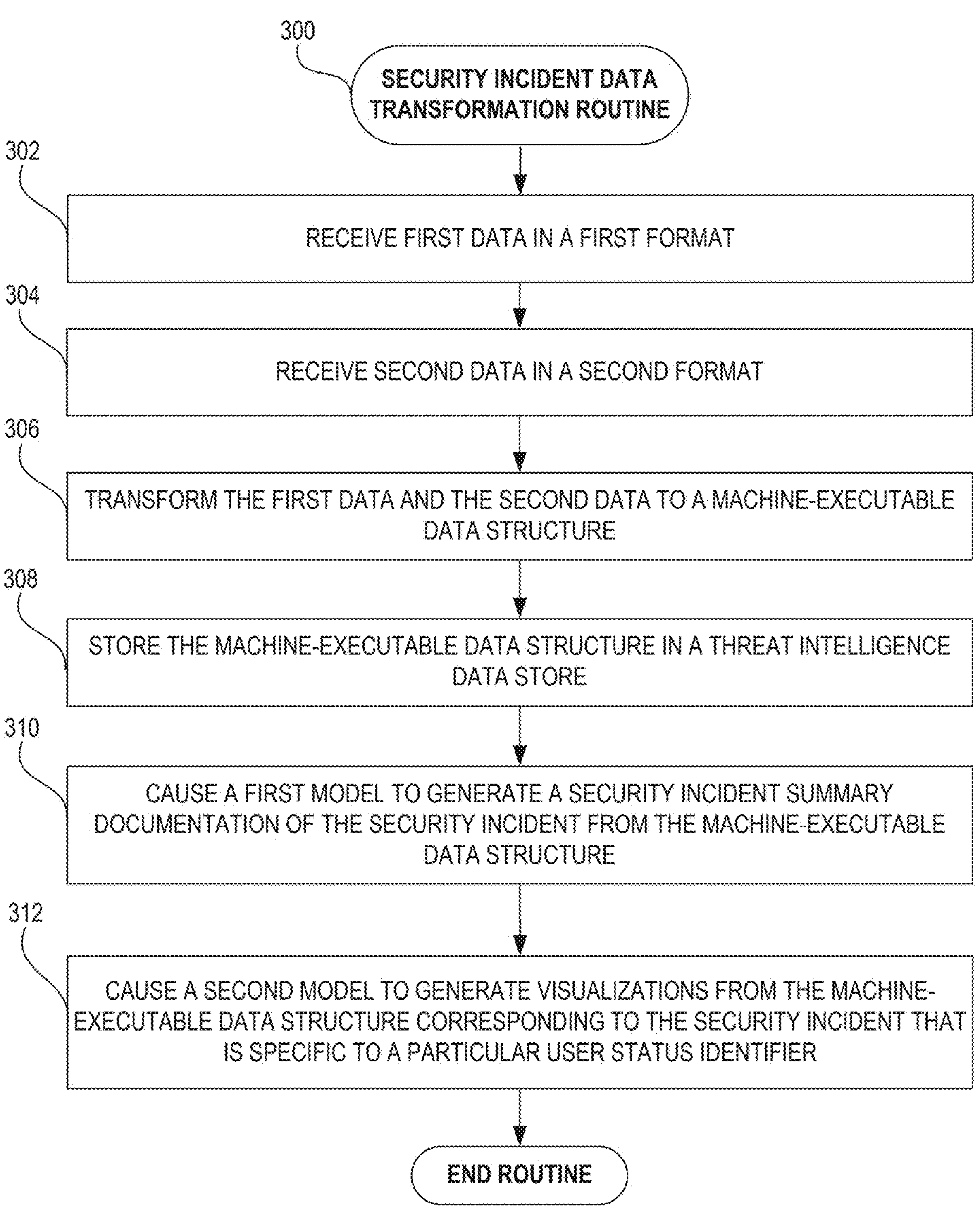
FIG. 3 is a flow diagram of an illustrative routine for security incident data transformation in accordance with this disclosure.

FIG. 3 is a flow diagram of an illustrative routine 300 that may be executed by a threat intelligence and aggregation system to provide increased security capabilities for networked components by aggregating, transforming, and disseminating security incident data. The routine 300 may begin in response to an event, such as receipt by a threat intelligence and aggregation system of a security incident report. For example, a client device may submit a report including or referencing model parameters and/or performance criteria as described herein.

Figure 4:
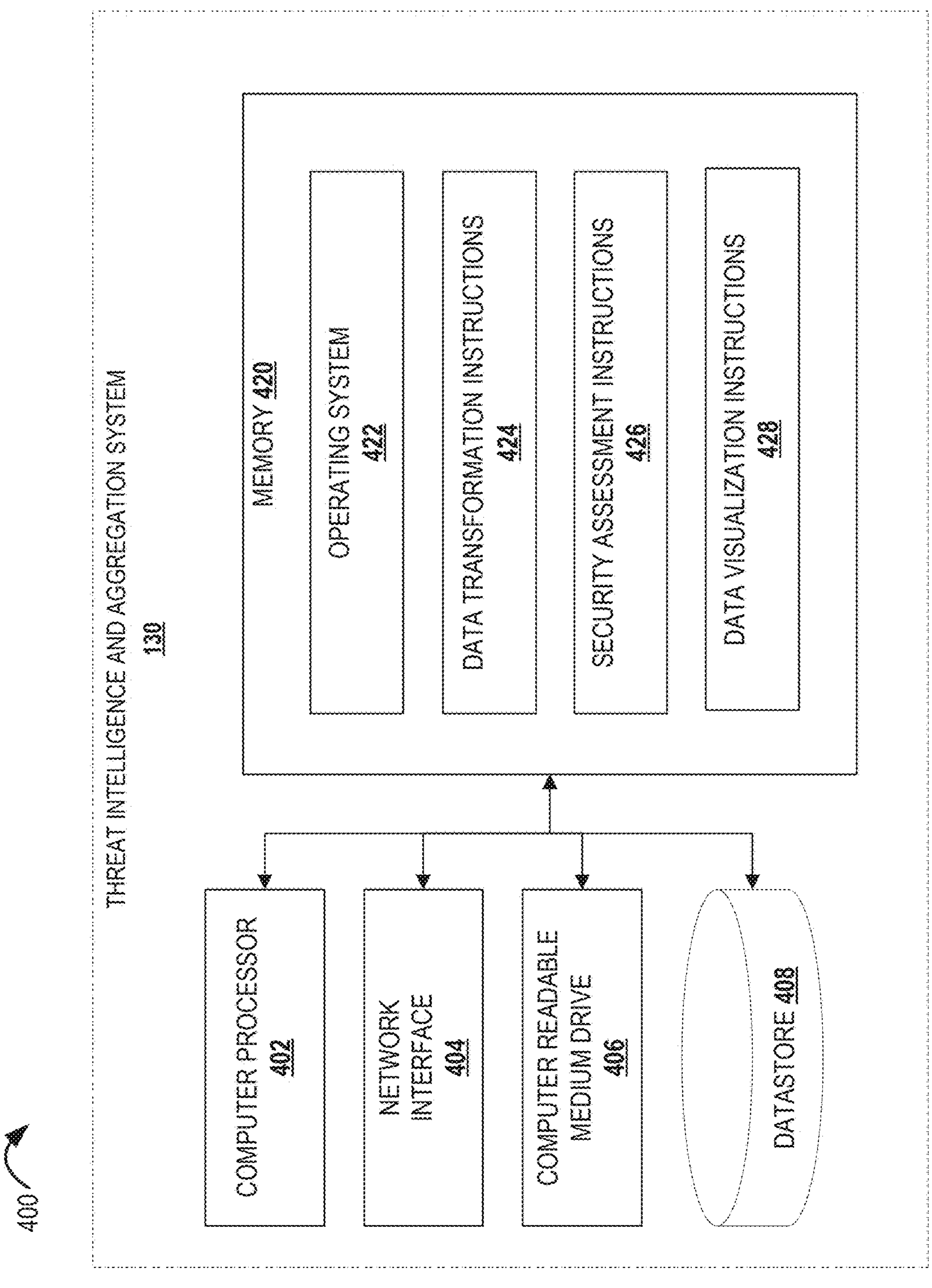
FIG. 4 is a block diagram of an illustrative computing system configured to implement the functionality of the threat intelligence and aggregation system in accordance with this disclosure.

When the routine 300 is initiated, a set of executable program instructions stored on one or more non-transitory computer-readable media (e.g., hard drive, flash memory, removable media, etc.) may be loaded into memory (e.g., random access memory or "RAM") of a serving configuration system, such as the threat intelligence and aggregation system 130 shown in FIG. 4, and executed by one or more processors. In some embodiments, the routine 300 or portions thereof may be implemented on multiple processors, serially or in parallel.

At block 302, the threat intelligence and aggregation system receives first data in a first format. The first data may include human intelligence from an incident responder regarding a security incident. The human intelligence may include detailed observations, contextual knowledge, and expert insights about the security incident. For example, an incident responder might document the timeline of events, the tactics and techniques used by the threat actor, root causes, and any mitigation actions taken. The first format may include a virtual document including the human intelligence. Although the first data is described to be human intelligence, in some examples, the first data may be other forms of data in a same (or different) format structure. For example, the first data may include data presented by an LLM in the first format (or another format).

At block 304, the threat intelligence and aggregation system receives second data in a second format. The second data may include machine-readable data. For example, the machine-readable data may include log data of computing devices associated with the security incident, having device log data and networked interaction data, capturing detailed records of activities and events occurring on devices. For example, the second data may include authorized or unauthorized access attempts, session credentials from console logins, device access times, and user identifiers. The networked interaction data may provide information about the geographical origin of the threat, MFA by user identity, API event name occurrences, communication network addresses, and device-level addresses.

At block 306, the threat intelligence and aggregation system transforms the first data and the second data to a machine-executable data structure. In some examples, the threat intelligence and aggregation system may parse the first data and the second data, extracting data associated with the security incident, and structuring the information into a standardized format. Structuring the information in a standardized format ensures consistency and compatibility with other systems and/or services, facilitating integration with services such as usage with LLMs. In some examples, the machine-executable data structure is formatted for inputting into LLMs and accessing via APIs.

At block 308, the threat intelligence and aggregation system stores the machine-executable data structure in a threat intelligence data store. The threat intelligence data store may provide a repository for transformed security incident data, providing a single source of truth for threat intelligence. In this way, the threat intelligence and aggregation system may allow services to access the machine-executable data structure (and other data) via API calls, facilitating data management and ensuring the threat intelligence is available for performing services such as, analysis, reporting, and decision-making.

At block 310, the threat intelligence and aggregation system causes a first model to generate a security incident summary documentation of the security incident from the machine-executable data structure. In some examples, the first model may operate as described herein to obtain the machine-executable data structure and generate a security incident summary, including an overview of events (such as a timeline), impact of the security incident, and actions taken. The threat intelligence and aggregation system may provide a summary corresponding to a user status identifier. For example, the content of the summary may change when the user status identifier indicates the individual receiving the summary is of a particular role of an organization (for example, security engineer as compared with a senior manager).

At block 312, the threat intelligence and aggregation system causes a second model to generate visualizations from the machine-executable data structure corresponding to the security incident. In some examples, the second model may operate as described herein to obtain the machine-executable data structure and generate the visualizations. In some examples, the visualizations may include one or more graphical elements such as charts, graphs, and diagrams that illustrate aspects of the security incident. For example, a timeline chart may depict the sequence of events in association with the incident, showing when each event occurred and how the incident progressed over time. A heat map might show the geographical distribution of the threat, highlighting regions where the threat originated or had the most impact. Bar charts or pie charts could represent the frequency of specific threat actor TTPs observed in association with the incident. The visualizations adjust according to the user status identifier, ensuring that the information presented is relevant to the user's role and responsibilities. For instance, a security engineer might receive detailed technical visualizations, while a member of the leadership team might receive high-level summaries and trend analyses.

FIG. 4 illustrates various components of an example computing device 400 configured to implement various functionality of the threat intelligence and aggregation system 130.

In some embodiments, as shown, the threat intelligence and aggregation system 130 may include: one or more computer processors 402, such as physical central processing units ("CPUs"); one or more network interfaces 404, such as a network interface cards ("NICs"); one or more computer-readable medium drives 406, such as a high density disk ("HDDs"), solid state drives ("SSDs"), flash drives, and/or other persistent non-transitory computer-readable media; one or more data store 408, such as physical storage and/or remote storage, and/or other data storage components; and one or more computer-readable memories 420, such as random access memory ("RAM") and/or other volatile non-transitory computer-readable media.

The computer-readable memory 420 may include computer program instructions that one or more computer processors 402 execute in order to implement one or more embodiments. The computer-readable memory 420 can store an operating system 422 that provides computer program instructions for use by the computer processor(s) 402 in the general administration and operation of the threat intelligence and aggregation system 130.

In some embodiments, the computer-readable memory 420 can further include computer program instructions and other information for implementing aspects of the present disclosure. For example, the computer-readable memory 420 may include data transformation instructions 424 for transforming data associated with a security incident into machine-executable data structure, as described herein. As another example, the computer-readable memory 420 may include security assessment instructions 426 for generating a security assessment from the machine-executable data structure, as described herein. As another example, the computer-readable memory 420 may include data visualization instructions 428 for generating visualizations associated with the security incident from the machine-executable data structure, as described herein.

When a routine is initiated, a corresponding set of executable program instructions stored on a computer-readable medium drive 406 may be loaded into computer-readable memory 420 and executed by one or more computer processors 402. In some embodiments, a routine— or portions thereof—may be implemented on multiple computing devices and/or multiple processors, serially or in parallel.

All of the methods and jobs described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and jobs may be persistently stored by transforming physical storage devices, such as solid-state memory chips or magnetic disks, into a different state. In some embodiments, the computer system may be a cloud-based computing system whose processing resources are shared by multiple distinct business entities or other users.

A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare metal servers.

In the context of some software container services, a task refers to a container, or multiple containers working together, running to execute the functionality of a software application or a particular component of that application. In some implementations, tasks can also include virtual machines, for example, virtual machines running within instance(s) hosting the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method (including computer-implemented method), process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:

under control of a computing system comprising memory and one or more computer processors configured to execute specific instructions:

receiving first data in a first format, wherein the first data includes human intelligence from an incident responder regarding a security incident;

receiving second data in a second format, wherein the second data includes machine-readable data extracted from logs of computing devices associated with the security incident;

transforming the first data and the second data into a machine-executable data structure, wherein the machine-executable data structure is formatted for input into models and for access by a network-accessible service via an application programming interface (API);

storing the machine-executable data structure in a threat intelligence data store;

causing a first model to generate security incident summary documentation of the security incident from the machine-executable data structure; and causing a second model to generate visualizations from the machine-executable data structure corresponding to the security incident.

2. The computer-implemented method of claim 1, wherein transforming the first data and the second data to a machine-executable data structure further comprises transforming, by a computing device implementing a third model, the first data and the second data to the machine-executable data structure.

3. The computer-implemented method of claim 2, further comprising generating, by the third model, recommendation alerts associated with the security incident, wherein the recommendation alerts are generated in association with the security incident.

4. The computer-implemented method of claim 1, further comprising:

comparing data from the security incident summary documentation and the visualizations to personal identifiable information stored in the threat intelligence data store; and when personally identifiable information is present, removing personally identifiable information from the security incident summary documentation.

5. The computer-implemented method of claim 1, wherein the machine-executable data structure is in a JavaScript Object Notation (JSON) format.

6. The computer-implemented method of claim 1, wherein when retrieved by the network-accessible service via an API call, the machine-executable data structure is executable by the network-accessible service to mitigate security vulnerabilities.

7. The computer-implemented method of claim 1, wherein when retrieved by the network-accessible service via an API call, the machine-executable data structure is executable by the network-accessible service to identify security vulnerabilities.

8. The computer-implemented method of claim 1, further comprising causing execution of the machine-executable data structure to present one or more of threat actor tactics and techniques, a region of unauthorized events, session credentials associated with the security incident, unauthorized activity by user identity type, multi-factor authentication enablement by user identity type, or occurrence of initial access identifiers.

9. One or more non-transitory computer-readable media comprising computer-executable instructions that, when executed by a computing system, cause the computing system to:

receive first data in a first format, wherein the first data includes human intelligence from an incident responder regarding a security incident;

receive second data in a second format, wherein the second data includes machine-readable data extracted from logs of computing devices associated with the security incident;

transform the first data and the second data to a machine-executable data structure;

cause a first model to generate security incident summary documentation of the security incident from the machine-executable data structure; and cause a second model to generate visualizations from the machine-executable data structure corresponding to the security incident.

10. The one or more non-transitory computer-readable media of claim 9, wherein transforming the first data and the second data to a machine-executable data structure is performed by a computing device implementing a third model.

11. The one or more non-transitory computer-readable media of claim 10, further comprising generating, by the computing device implementing the third model, recommendation alerts associated with the security incident, wherein the recommendation alerts are generated in association with the security incident.

12. The one or more non-transitory computer-readable media of claim 9, further comprising:

comparing data from the security incident summary documentation and the visualizations to personal identifiable information stored in a threat intelligence data store; and when personally identifiable information is present, removing personally identifiable information from the security incident summary documentation.

13. The one or more non-transitory computer-readable media of claim 9, wherein the machine-executable data structure is in a JavaScript Object Notation (JSON) format.

14. The one or more non-transitory computer-readable media of claim 9, wherein when retrieved by a network-accessible service via an application programming interface (API) call, the machine-executable data structure is executable by the network-accessible service to mitigate security vulnerabilities.

15. The one or more non-transitory computer-readable media of claim 9, wherein when retrieved by a network-accessible service via an API call, the machine-executable data structure is executable by the network-accessible service to identify security vulnerabilities.

16. The one or more non-transitory computer-readable media of claim 9, further comprising causing execution of the machine-executable data structure to present one or more of threat actor tactics and techniques, a region of unauthorized events, session credentials associated with the security incident, unauthorized activity by user identity type, multi-factor authentication enablement by user identity type, or occurrence of initial access identifiers.

17. A system comprising:

a data transformation system, comprising a processor and memory, wherein the memory comprises executable instructions that, when executed by the processor, cause the processor to:

receive first data in a first format, wherein the first data includes human intelligence from an incident responder regarding a security incident;

receive second data in a second format, wherein the second data includes machine-readable data extracted from logs of computing devices associated with the security incident;

transform the first data and the second data into a machine-executable data structure, wherein the machine-executable data structure is formatted for input large language models (LLMs) and for access by a network-accessible service via an application programming interface (API); and store the machine-executable data structure in a threat intelligence data store, wherein when retrieved by the network-accessible service via an API call, the machine-executable data structure is executable by the network-accessible service to mitigate security vulnerabilities;

a first computing device implementing a first LLM, wherein the first LLM comprises an instance of an incident documentation model to send one or more output of the incident documentation model to the data transformation system, the first LLM configured to:

obtain the machine-executable data structure from the threat intelligence data store; and generate security incident summary documentation of the security incident from the machine-executable data structure; and a second computing device implementing a second LLM, wherein the second LLM comprises an incident visualization model to send one or more output of the incident visualization model to the data transformation system, the second LLM configured to:

obtain the machine-executable data structure from the threat intelligence data store; and generate visualizations from the machine-executable data structure corresponding to the security incident that is specific to a particular user status identifier, wherein the visualizations adjust according to the user status identifier.

18. The system of claim 17, wherein executable instructions, when executed, further cause the processor to execute a third LLM, wherein the third LLM comprises a data transformation model to send one or more output of the data transformation model to the threat intelligence data store, the third LLM configured to transform the first data and the second data to the machine-executable data structure.

19. The system of claim 18, wherein the third LLM is further configured to generate recommendation alerts associated with the security incident, wherein the recommendation alerts are generated in association with the security incident.

20. The system of claim 17, wherein the executable instructions, when executed, further cause the processor to:

compare data from the security incident summary documentation and the visualizations to personal identifiable information stored in the threat intelligence data store; and when the data transformation system determines personally identifiable information is present, remove personally identifiable information from the security incident summary documentation.

* * * * *